United States Patent [19]

Pavlath et al.

[11] Patent Number: 4,529,312
[45] Date of Patent: Jul. 16, 1985

[54] FIBER OPTIC ROTATION SENSOR UTILIZING UNPOLARIZED LIGHT

[75] Inventors: George A. Pavlath; Herbert J. Shaw, both of Stanford, Calif.

[73] Assignee: The Board of Trustees of the Leland Stanford Junior University, Stanford, Calif.

[21] Appl. No.: 288,212

[22] Filed: Jul. 29, 1981

[51] Int. Cl.³ .............................................. G01B 9/02
[52] U.S. Cl. ................................................... 356/350
[58] Field of Search ........................................ 356/350

[56] References Cited

U.S. PATENT DOCUMENTS

| | | | |
|---|---|---|---|
| 3,395,270 | 7/1968 | Speller | 356/350 |
| 4,325,636 | 4/1982 | Schiffner | 356/350 |
| 4,410,275 | 10/1983 | Shaw et al. | 356/350 |

OTHER PUBLICATIONS

"Low-Drift Fibre Gyro Using a Superluminescent Diode," Bohm et al., Electronics Letters, May 14, 1981, vol. 17, #10, pp. 352-353.
"Fiber-Optic Gyroscopes with Broad-Band Sources", Burns et al., Jour. of Lightwave Tech., vol. LT-1, No. 1, Mar. 1983, pp. 98-105.
Fundamentals of Optics, Jenkins et al., McGraw-Hill Book Co. 1957, pp. 489-490.
"An Overview of Fiber-Optic Gyroscopes", Bergh et al., Jour. of Lightwave Tech., vol. LT2, No. 2, Apr. 1984, pp. 94-95.
"Fiber Laser Gyroscope", Vali et al., SPIE vol. 77 (1976), Fibers & Integrated Optics" pp. 110-115.
"Sensitivity Analysis of the Sagnac-Effect Optical-Fiber Ring Interferometer", Lin et al., Applied Optics, vol. 18, No. 6, Mar. 15, 1979, pp. 915-931.

Primary Examiner—Vincent P. McGraw
Attorney, Agent, or Firm—Knobbe, Martens, Olson & Bear

[57] ABSTRACT

A fiber optic rotation sensor, employing detection of the Sagnac phase shift, comprises a single mode fiber forming a loop. The rotation sensor utilizes unpolarized light to provide reciprocal operation. The unpolarized light produces incoherent light wave components which are averaged to zero in the detector. Non-rotationally induced phase shifts between coherent components resolve into vectors equal in magnitude and opposite in phase angle so that the non-reciprocal components of these vectors cancel.

The rotation sensor is independent of environmental factors when the phase difference between the waves counterpropagating through the loop is an odd multiple of $\pi/2$. Accordingly, the sensor includes a phase shifter for biasing such phase difference to $\pi/2$ to provide a stable operating point when the loop is at rest. Additional compensating means are included to provide stability during rotation.

36 Claims, 14 Drawing Figures

FIBER OPTIC ROTATION SENSOR UTILIZING UNPOLARIZED LIGHT

The Government has rights in this invention pursuant to Contract Number F49620-80C-0040 awarded by the Air Force Office of Scientific Research.

BACKGROUND OF THE INVENTION

The present invention relates to rotation sensors, such as gyroscopes, and particularly to a fiber optic rotation sensor.

Fiber optic rotation sensors are particularly advantageous, since they operate without moving parts, and therefore, are potentially very reliable. Typically, rotation sensing is accomplished by detection of a rotationally induced phase shift, commonly referred to as the "Sagnac phase shift", between light waves which propogate in opposite directions around a closed loop formed by a coil of optical fiber. This "Sagnac" phase shift is defined by the well known relationship:

$$\phi_s = \frac{8\pi N A \Omega}{\lambda c}$$

Where A is the area bounded by the loop of optical fibers, N is the number of turns of the optical fiber about the area A, omega ($\Omega$) is the angular velocity of the loop about an axis which is perpendicular to the plane of the loop, and lamda ($\lambda$) and c are the free space values of the wave length and velocity, respectively, of the light applied to the loop.

The present state of the art of fiber optic rotation sensors uses polarized light through single mode optical fibers. Early development efforts were characterized by non-reciprocal operation of the rotation sensors, due to the fact that single mode fibers have two orthogonal polarization modes, each of which generally propogates light at a velocity different than the other. The residual birefringence of the single mode fiber caused some of this polarized light to be cross-coupled into the other of the two polarization modes. Consequently, because of the different velocities of propogation in the two polarization modes, a non-rotationally induced phase shift was introduced, thereby causing non-reciprocal operation of the rotation sensors. It was later found that reciprocal operation could be achieved by placing a polarizer at the output side of the rotation sensor to block any light that was cross-coupled to the other polarization mode. Other solutions involved use of a polarization controller, either separately or in combination with the output polarizer, as disclosed in U.S. Pat. No. 4,410,275; issued Oct. 18, 1983, Entitled "Fiber Optic Rotation Sensor".

SUMMARY OF THE INVENTION

The present invention provides a fiber optic gyroscope which utilizes substantially unpolarized light. The term "unpolarized light", as used herein, is defined as light which has equal intensities in any two orthogonal polarization states; the components of the light in these orthogonal polarization states having a phase difference which varies randomly with time. The inventors have found that, surprisingly, use of unpolarized light results in reciprocal operation of fiber optic rotation sensors, utilizing single mode optical fibers, without an output polarizer or other special equipment, even though substantial cross-coupling occurs between the two polarization modes. Such reciprocal operation is due, at least in part, to the fact that, since the light source is unpolarized, the light propagating in the two orthogonal polarization modes will be incoherent. Thus, the non-rotationally induced phase shifts between the incoherent components of the light waves will be averaged to zero in the detector. Further, it has been found that the non-rotationally induced phase shifts between coherent components of light resolve into vectors equal in magnitude and opposite in phase angle so that the non-reciprocal components of these vectors cancel each other. Thus, use of the unpolarized light causes the non-rotationally induced phase shift between the counterpropagating waves to be effectively eliminated, without a polarizer or other special equipment, while providing reciprocal operation.

Another significant advantage of utilizing unpolarized light is that the rotation sensor is not affected by variations in environmental conditions when the phase difference between the counterpropagating wave is an odd multiple of $\pi/2$. Thus, by biasing the phase difference of such counterpropagating waves to $\pi/2$ (or in odd multiple thereof), when the system is at rest, the rotation sensor will have a stable operating point, i.e. the magnitudes of the average intensities of the superposed counterpropagating light waves are constant and independent of changes in environmental factors, such as temperature, which produce changes in the fiber birefringence.

A further advantage of the present invention is that use of both polarization modes permits transmission of a greater portion of the light from the light source, and thus, eliminates the losses associated with utilizing an output polarizer to block one of the polarization modes.

BRIEF DESCRIPTION OF THE DRAWINGS

These and other advantages of the present invention are best understood through reference to the drawings in which.

DETAILED DESCRIPTION OF THE PREFERRED EMBODIMENT

Figure 1:
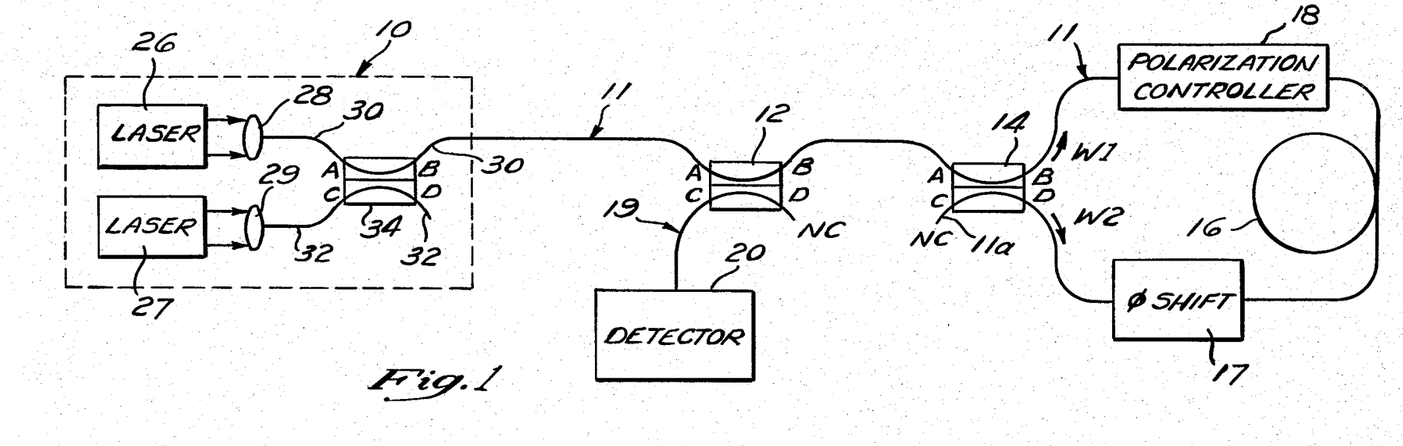
FIG. 1 is a schematic drawing illustrating the component parts of the present invention.

In the preferred embodiment, shown in FIG. 1, the rotation sensor of the present invention comprises a substantially unpolarized light source 10, for introducing unpolarized light into a continuous length or strand of single mode optical fiber 11. The fiber 11 passes through ports, labeled A and B, of a first directional coupler 12, and through ports labeled A and B of a second directional coupler 14. Thus, the fiber 11 extends from the light source 10 to the port A of the coupler 12, and extends from the port B of the coupler 12 to the port A of the coupler 14. The portion of the fiber 11 extending from the port B of the coupler 14 is wound into a loop 16. By way of specific example, the loop 16 may comprise 150 turns each bounding an area of about one square meter. The end of the fiber 11, from the loop 16, is passed through ports, labeled C and D, of the coupler 14, with the port D adjacent to the loop 16. A small portion 11a of the fiber 11 extends from the port C of the coupler 14 and terminates non-reflectively at a point labeled "NC". Preferably, a phase shifter 17 is placed in the loop 16 to bias the relative phase shift between the counterpropagating waves in the loop 16 to $\pi/2$. A polarization controller 18 is advantageously placed in the loop 16 to control the state of polarization of the waves.

A second length of fiber 19 is passed through the ports labeled C and D of the coupler 12. The portion of the fiber 19 projecting from the port D terminates non-reflectively, without connection, at a point labeled "NC". However, the portion of the fiber 19 projecting from the port C of the coupler 12 is optically coupled to a photodetector 20, which produces an output signal proportional to the intensity of the fringe pattern impressed thereon.

As used in this patent specification, the term "substantially unpolarized" light includes light having both polarized and unpolarized components. The percentage of polarized light will determine the accuracy of the gyroscope. Thus, the phase error ($\phi_e$) of gyroscopes constructed in accordance with the present invention is defined by the equation:

$$\phi_e \leq \frac{P(\%)}{100} \text{ where } P < 10\%$$

P being the degree of polarization of the light source 10 and $\phi_e$ being measured in radians.

The particular source 10 will be determined by the accuracy requirements of the gyroscope and the light sources available. In the present state of the art, the best available laser sources of unpolarized light have a degree of polarization (P) of the order of 5%. By way of specific example, the source 10 may comprise a Model 155 randomly polarized HeNe laser manufactured by Spectraphysics, Mountain View, Calif. For greater accuracy, the preferred embodiment of the invention utilizes a light source 10 having a substantially lower percentage of polarization, e.g., less than 0.1% which is provided in the manner shown in FIG. 1 by combining two laser sources 26, 27 of polarized light. These sources 26, produce linearly polarized light having horizontal and vertical polarizations, respectively. These sources 26, 27 are operated independently of each other, and their respective outputs are non-coherent. The light from the sources 26, 27 is applied, through lenses 28, 29, respectively, to a portion 30 of the fiber 11, and a separate fiber 32, respectively. These fibers 30, 32 are passed through ports A and B, and C and D, respectively, of a directional coupler 34. The portion of the fiber 32 projecting from the port D terminates non-reflectively, without connection. Light from the sources 26, 27 is applied to ports A and C, and is mixed by the coupler 34 to provide unpolarized light at the port B for propagation in the fiber 11.

By way of specific example, the single mode fibers 11, 19, and 32 may be of the type marketed by ITT (International Telephone and Telegraph Corporation) Electro-Optical Products Division, Roanoke, Va., as type T-110 single mode step index optical fiber.

The Couplers 12, 14, and 34

Figure 2:
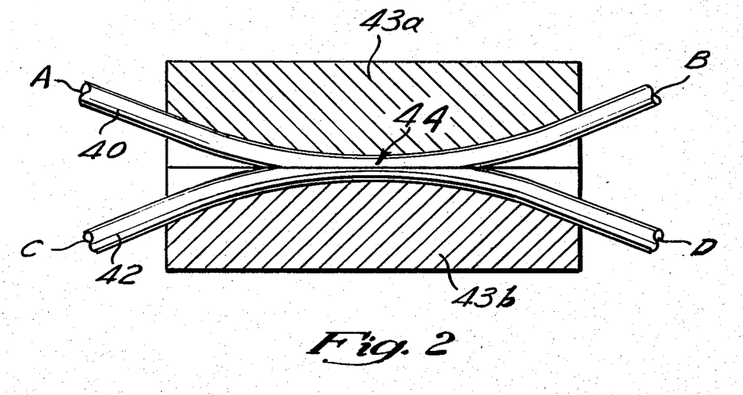
FIG. 2 is an elevation view, in partial cross section, of a preferred type of coupler for use in the present invention.

A preferred fiber optic directional coupler for use as the couplers 12, 14, and 34 in the rotation sensor or gyroscope of the present invention is illustrated in FIG. 2. This coupler and a method of manufacturing the coupler are described in detail and claimed in copending application filed by John Shaw, one of the coinventors of this application, as Ser. No. 139,551, filed Apr. 11, 1980. The coupler comprises two optical fiber strands, labeled 40, 42 in FIG. 2, of a single mode fiber optic material having the cladding removed from one side thereof. The two strands 40, 42, mounted in arcuate slots on respective blocks 43(a), 43(b), are brought together with the portions of the strands where the cladding has been removed in close spaced relationship, to form a region of interaction 44 in which the light is transferred between the core portions of the strands.

The amount of material removed is such that the core portion of each strand is within the evanescent field of the other. The center-to-center spacing between the strands at the center of the coupler is typically less than about 2 to 3 core diameters.

It is important to note that the light transferred between the strands 40, 42 at the region of interaction 44 is directional. That is, substantially all of the light applied to input port A is delivered to the output ports B and D, without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially non-discriminatory with respect to polarizations, and thus, preserves the polarization of the coupled light. Thus, for example, if a light beam having a vertical polarization is input to port A, has light coupled from port A to port D, as well as the light passing straight through from port A to port B, will remain vertically polarized.

From the foregoing, it can be seen that the coupler may function as a beam splitter. Further, the coupler may be used to combine beams from the laser sources 26, 27 or to recombine the previously split beams. For example, if one beam is applied to port B and another to port D, these two beams will be combined in the interaction region 44, and the combined beams will be output at ports A and C. Similarly if one beam is applied to port A and another to port C, these two beams will be combined and output at ports B and D.

General Operation of the Present Invention

Referring to FIG. 1, a continuous wave of substantially unpolarized light, from the light source 10, propagates through the fiber 11 to port A of the coupler 12, where a portion of the light is lost through port D. The remaining light, still unpolarized, propagates from port D of the coupler 12 to port A of the coupler 14, where the unpolarized light is split into two waves, W1, W2. The wave W1 travels from port B of the coupler 14 in a clockwise direction about the loop 16 to port D of the coupler 14. The wave W2 travels from port D of the coupler 14 in a counterclockwise direction through the loop 16 to port B of the coupler 14. As is well known, the counterpropagating waves W1, W2 may be shifted in phase when they reach ports D and B, respectively, of the coupler 14, and thus, they may interfere constructively or destructively to produce an optical output signal when recombined by the coupler 14, the magnitude and type of such interference depending upon the amount of the phase shift. When the waves W1, W2 are recombined by the coupler 14, a portion of the recombined wave is lost through the port C, while the remaining recombined wave travels from the port A of the coupler 14 to port B of the coupler 12, where it is again split with a portion thereof transferred to the fiber 19 at port C. It will be recalled that the fiber 19 is optically coupled to the photodetector 20 to permit the combined waves W1, W2 to be incident thereon so that light from all the fiber modes is detected. The detector 20, in response, outputs an electrical signal that is proportional to the optical intensity of combined waves W1, W2.

It will be recognized that this optical intensity will vary in proportion to the type and amount of interference between the waves W1, W2, and thus, the optical intensity of the waves W1, W2 will be a function of the phase shift between the waves W1, W2. Since the phase shift is indicative of rotation of the loop about its central axis (assuming that the entire phase shift is rotationally induced and due to the Sagnac effect), the detector output signal will vary in response to such rotation.

As described in detail hereinafter, it is significant that the rotation sensor of the present invention may be biased, by the phase shifter 17, to an operating point which is stable and insensitive to environmental changes, and which provides maximum sensitivity to rotation.

Another important feature of the present invention is that the rotation sensor is completely reciprocal in operation, the non-rotationally induced phase shifts having been eliminated by use of unpolarized light. The reasons for this reciprocal operation and stable operating point will be presented in more detail below.

Reciprocal Operation

Figure 3:
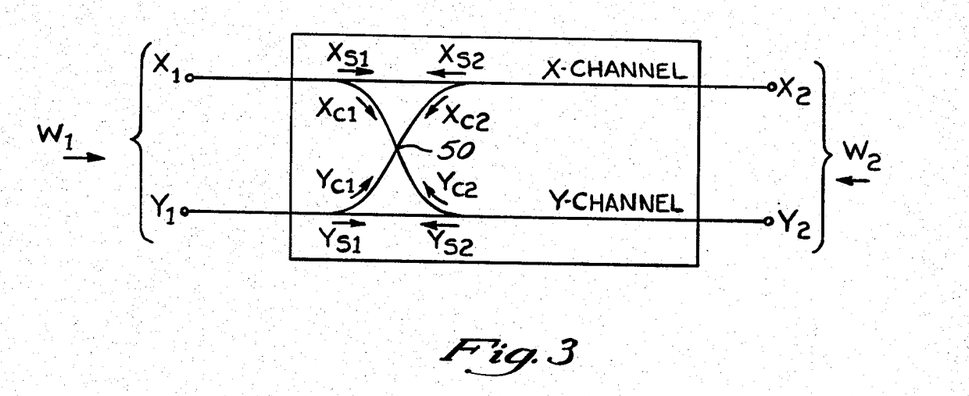
FIG. 3 is a schematic diagram of a conceptual model of a single mode fiber representing, for example the loop, showing an X and a Y channel as representing the two polarization modes of the fiber, respectively, showing cross coupling therebetween, and showing the components of the waves W1, W2 counterpropagating through the fiber.

It has been found that, surprisingly, the non-reciprocal components of the counterpropagating waves W1, W2 are effectively cancelled, either vectorially, or in the detector 20 itself, by utilizing unpolarized light. This can best be understood by referring to the conceptual model of a single mode optical fiber, shown in FIG. 3, representing, for example, the loop 16 of FIG. 1. The two polarization modes of the single mode optical fiber are schematically represented by the line connecting a pair of terminals X1-X2 and the line connecting a second pair of terminals Y1-Y2, respectively. The two modes represented by these lines will be referred to as the "X channel" and the "Y channel", respectively. Since the two polarization modes have different propagation coefficients, light will propagate at a higher velocity in one of the channels than in the other. For purposes of illustration, the X-channel will be referred to as the "fast" channel, while the Y-channel will be referred to as the "slow" channel. Furthermore, since birefringence, inherent in all presently available fibers, causes cross-coupling between the channels, this conceptual model includes a line connecting Y1 and X2, and another line connecting X1 and Y2. The intersection of these two cross-coupling lines will be referred to as the "scattering center" 50. This scattering center 50 is shown as being offset from the center of the fiber to conceptually illustrate that cross coupled light will travel a longer path in one of the channels that in the other. Since the two polarization modes have different coefficients of propagation, this cross coupled light is typically the source of non-reciprocal behavior in fiber loops.

Since this model represents the fiber loop 16 (FIG. 1), it will be assumed that wave W1 is applied to terminals X1 and Y1 at one end of the fiber, while wave W2 is applied to terminals X2 and Y2 at the other end of the fiber. Wave W1 may be resolved into components $X_{s1}$, $Y_{s1}$, $X_{c1}$, and $Y_{c1}$. $X_{s1}$ denotes that portion of wave W1 in the X-channel that travels "straight through", from X1 to X2, without being cross-coupled to the Y-channel. $X_{c1}$ on the other hand, denotes the remaining portion of the X-channel component of W1 which is cross coupled into the Y-channel, from X1 to Y2. Similarly, $Y_{s1}$ denotes the Y-channel component of W1 which passes "straight through" from Y1 to Y2 without cross-coupling, while $Y_{c1}$ represents the portion of this Y-channel light that is cross-coupled to the X-channel, from Y1 to X2. The wave W2 may be similarly resolved into corresponding components, $X_{s2}$, $Y_{s2}$, $X_{c2}$, and $Y_{c2}$, using the same convention. It will be understood that this model is presented only as an aid in describing the behavior of the light as it passes through the fiber loop 16, and is not intended to be a full and complete description of the behavior of such light. For example, those skilled in the art will recognize that, in actuality, multiple cross-couplings may occur between the two polarization modes, even though only a single cross coupling is illustrated in the model.

Figure 4:
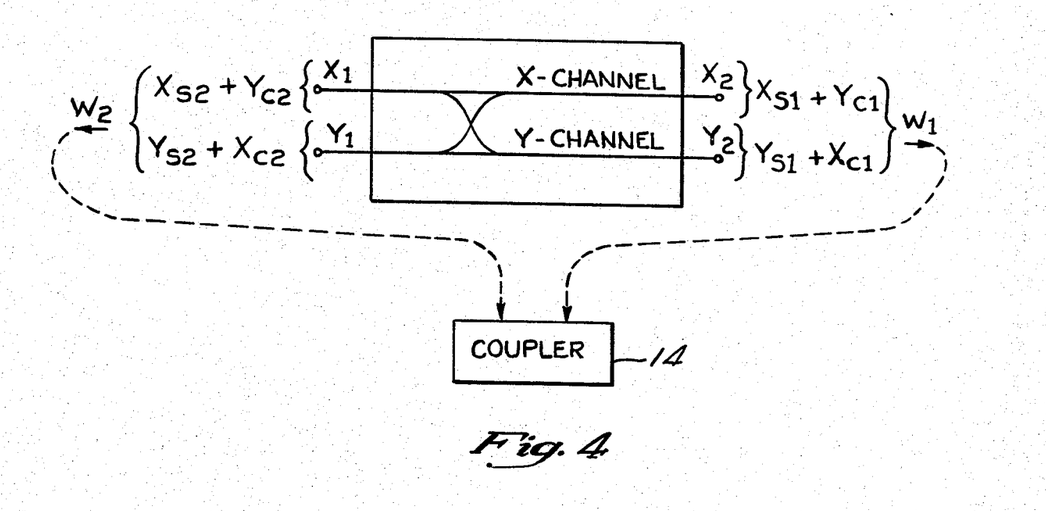
FIG. 4 is a schematic diagram of the single mode fiber of FIG. 3, showing the components of the waves W1, W2 after they have propagated through the fiber, before they are combined at the coupler 14.

FIG. 4 illustrates the components of the waves W1, W2 after they have propagated about the loop 16 in opposite directions. It will be seen that each of the channels, at each of their respective ends, includes both a straight-through component and a cross-coupled component. Thus, for example, the light at the terminal X1 includes X channel light ($X_{s2}$) which has traveled the path X2-X1, and Y channel light ($Y_{C2}$) which has traveled the path Y2-X1. Similarly, at the terminal Y1, the light includes a Y channel straight-through component ($Y_{s2}$) and an X channel cross-coupled component ($X_{c2}$). This same relationship holds true for the X2 and Y2 terminals, the X2 terminal including the $X_{s1}$ and $Y_{c1}$ components and the Y2 terminal including the $Y_{s1}$ and $X_{c1}$ components. All of these components are superposed when the waves W1,W2 are combined in the coupler 14, as illustrated schematically in FIG. 4.

In examining the effect of the superposition of the electric fields of these eight components upon the photodetector 20 (FIG. 1), it is important to recognize that the detector 20 is a "square law detector", which produces an output signal that is proportional to the light intensity. The effect of such electric field superposition therefore, may be understood through reference to the following well known equation for the observed intensity of the superposition of two electric fields:

$$I_T = |E_x|^2 + |E_y|^2 + 2|\hat{E}_x \cdot \hat{E}_y| \cos \phi \qquad (1)$$

Where:

$I_T$ is the total observed intensity for the superposition of two electric fields;

$E_x$ is the magnitude of one of the electric fields;

$E_y$ is the magnitude of the other of the electric fields; and $\phi$ is the phase shift between the light waves producing the two electric fields.

It should be understood that as applied to the present discussion, the phase shift $\phi$ of equation (1) is comprised of a rotationally induced, "Sagnac" phase shift $\phi_s$ and a non rotationally induced, birefringence dependent phase shift $\phi_B$. Thus:

$$\phi = \phi_s + \phi_B \qquad (2)$$

However, for the purpose of understanding the reciprocal behavior of the rotation sensor of the present invention, it will be assumed that the loop 16 (FIG. 1) is at rest, and thus, that $\phi_s$ is equal to zero. Accordingly, for the present, it will be assumed that $\phi$ equals $\phi_B$.

From equation (1), it is apparent that the total observed intensity is equal to the sum of the individual intensities produced by the superposed fields, $E_x$, $E_y$, plus an "interference term" which is a function of the dot product of the two field vectors, as well as of the phase shift $\phi$. It will be seen from the following analysis that this interference term is the source of non-reciprocal behavior between certain pairs of components, but that this non-reciprocal behavior effectively cancels when all components are superposed, so that the overall operation of the rotation sensor is reciprocal. Further, as between other pairs of components, it will be shown that the interference term reduces to zero. Accordingly, Equation 1 may be simplified under the following conditions which are of particular interest in regard to the present discussion of single mode optical fibers:

A. The light waves are incoherent.

When the light waves are incoherent, the phase shift $\phi$ is defined by a complex function which may be considered essentially random and uniformly distributed. Thus, the "interference term", referred to above, averages to zero over time. Consequently, for incoherent light, equation (1) reduces to:

$$I_T = |E_x|^2 + |E_y|^2 \qquad (3)$$

Since the intensity produced by an electric field is proportional to the square of the electric field, equation (3) may be rewritten as:

$$I_T = I_x + I_y \qquad (4)$$

Where $I_x$ and $I_y$ are the intensities produced by the fields $E_x$ and $E_y$, respectively.

B. The fields are orthogonal

The dot product of two orthogonal fields is equal to zero. Therefore, when the fields are orthogonal, equation (1) reduces to:

$$I_T = |E_x|^2 + |E_y|^2 \qquad (5)$$

or $$I_T = I_x + I_y \qquad (6)$$

C. The fields are parallel

When the fields are parallel, the dot product of the field vectors is equal to their arithmetic product. Thus, under this condition, equation (1) reduces to:

$$I_T = |E_x|^2 + |E_y|^2 + 2|E_x||E_y| \cos \phi \qquad (7)$$

or $$I_T = I_x + I_y + 2\sqrt{I_x I_y} \cos \phi \qquad (8)$$

where $\phi$, as will be recalled, represents only the birefringence dependent phase shift, since the loop 16 is presently assumed to be at rest.

It will be understood that, while equations (7) and (8) are valid for defining the intensity of two superposed light wave components which are of the "straight through" type (e.g. $X_{s1}$, $X_{s2}$, $Y_{s1}$, and $Y_{s2}$), these equations require modification for defining such intensity in regard to the "cross coupled" components (e.g. $X_{c1}$ and $X_{c2}$, or $Y_{c1}$ and $Y_{c2}$). Mathematical analysis of the single mode fiber model of FIGS. 3 and 4, utilizing Jones Matricies, produces these modified equations for cross coupled components as follows:

$$I_t = |E_x|^2 + |E_y|^2 + 2|E_x||E_y| \cos \pm (\pi - \phi) \qquad (9)$$

or $$I_T = I_x + I_y + 2\sqrt{I_x I_y} \cos \pm (\pi - \phi) \qquad (10)$$

As will be discussed more fully below, whether the value "$\pi - \phi$" is positive or negative depends upon the location of the "scattering center" 50, discussed in reference to FIG. 3, and upon the direction of propagation of the components $X_{c1}$ $X_{c2}$ and $Y_{c1}$ $Y_{c2}$.

By applying the relationships defined by the foregoing equations (3) through (10) to the single mode fiber model of the loop 16, shown in FIG. 4, it will be seen that the interference terms of the components of the counterpropagating waves W1, W2 are either cancelled in the detector 20, or combine in such a manner as to eliminate non reciprocal behavior. Such application of the equations (3) through (10) is set forth immediately below.

It will be recalled in reference to FIG. 1 that the substantially unpolarized light source 10 is comprised of two independent light sources having polarizations which are mutually orthogonal and having outputs which are mutually incoherent. Consequently, the light produced by one of these sources (e.g. X-channel light) will be incoherent with respect to the light produced by the other of the sources (e.g. Y-channel light). Therefore, the X and Y channel components at the terminals X1, Y1, X2, and Y2, discussed above in reference to FIG. 4, will be incoherent with respect to each other. Since the phase shift between incoherent components of light is essentially random and uniformly distributed, this phase shift will be averaged to zero in the detector 20 (as discussed above in reference to equations (3) and (4)), and therefore, the intensity resulting from the superposition of any X channel component with any Y channel component will be equal to the sum of the individual intensities of such components, as required by equation (4). For example, the intensity of components $X_{s1}$ will add directly to the intensity of component $Y_{c1}$, the intensity of $Y_{s1}$ will add directly to the intensity of $X_{c1}$, and so forth.

Furthermore, since the polarization modes corresponding to the X channel and Y channel are orthogonal, the resultant intensity produced by superposition of the components $Y_{s1}$, $X_{c1}$, $Y_{s2}$, $X_{c2}$ at the Y channel terminals Y1, Y2 adds directly to the resultant intensity produced by superposition of the components $X_{s1}$, $Y_{c1}$, $X_{s2}$ and $Y_{c2}$ at the X channel terminals X1, X2, as required by equation (6). Thus, when all of the components at the terminals X1, Y1, X2, Y2 are superposed, the only components which do not add directly in intensity are:

(a) Component $X_{s1}$ with component $X_{s2}$,
(b) Component $Y_{s1}$ with component $Y_{s2}$,
(c) Component $X_{c1}$ with component $X_{c2}$, and
(d) Component $Y_{c1}$ with component $Y_{c2}$, These pairs of components, of course, do not add directly in intensity because they are neither incoherent in phase nor do they have orthogonal fields. Accordingly, the sum of their intensities will contain an interference term.

For example, the superposition of components $X_{s1}$ and $X_{s2}$ produces an observed intensity $I_{xs}$ which is defined by equation (8), since their respective net field vectors are parallel and they have not been cross coupled. Thus:

$$I_{xs} = I_{x1} + I_{x2} + 2\sqrt{I_{x1}I_{x2}} \cos \phi \quad (11)$$

However, since neither $X_{s1}$ nor $X_{s2}$ are cross coupled components, there will be no birefringence dependent phase shift between them. Hence, as between $X_{s1}$ and $X_{s2}$, $\phi$ will be zero, and equation 11 reduces to:

$$I_{xs} = I_{x1} + I_{x2} + 2\sqrt{I_{x1}I_{x2}} \quad (12)$$

Similarly, since $Y_{s1}$ and $Y_{s2}$ are not cross coupled, the intensity $I_{ys}$ produced by the superposition of these components is as follows:

$$I_{ys} = I_{y1} + I_{y2} + 2\sqrt{I_{y1}I_{y2}} \quad (13)$$

With respect to components $X_{c1}$ and $X_{c2}$, and components $Y_{c1}$ and $Y_{c2}$, it will be necessary to utilize equation (10) rather than equation (8), since these components are of the cross coupled type. Thus, the intensity $I_{xc}$ produced by superposition of the components $X_{c1}$ and $X_{c2}$ is:

$$I_{xc} = I_{xc1} + I_{xc2} + 2\sqrt{I_{xc1}I_{xc2}} \cos(\pi - \phi)$$

Similarly, the intensity $I_{yc}$ produced by superposition of the components $Y_{c1}$ and $Y_{c2}$ is:

$$I_{yc} = I_{yc1} + I_{yc2} + 2\sqrt{I_{yc1}I_{yc2}} \cos[-(\pi - \phi)]$$

It will be noted that the phase difference (i.e. $\pi - \phi$) associated with the interference term of the X-channel components $X_{c1}$ $X_{c2}$ is equal and opposite to the phase difference (i.e. $-(\pi - \phi)$) associated with the interference term of the Y-channel components $Y_{c1}$ $Y_{c2}$. This occurs because the component $X_{c1}$ travels the same path as the counterpropagating component $Y_{c2}$, and the component $X_{c2}$ travels the same path as the counterpropagating component $Y_{c1}$, as is apparent by comparing FIGS. 3 and 4. Recalling that the X-channel is the "fast" channel and the Y-channel is the "slow" channel, and further recalling that, due to the scattering center 50, the path of components $X_{c1}$ and $Y_{c2}$ is primarily in the "slow" channel while the path of components $X_{c2}$ and $Y_{c1}$ is primarily in the "fast" channel, the phase of component $Y_{c1}$ will be advanced with respect to component $Y_{c2}$ by the same amount that the phase of the component $X_{c1}$ is retarded with respect to the component $X_{c2}$. The interference term associated with the components $X_{c1}$ and $X_{c2}$ therefore, will have a phase difference equal and opposite to the phase difference of the interference term associated with the components $Y_{c1}$ and $Y_{c2}$.

The total intensity $I_T$, produced by superposition of all eight components of the waves W1, W2 may be defined as:

$$I_T = I_{xs} + I_{ys} + I_{xc} + I_{yc} \quad (16)$$

Figure 5:
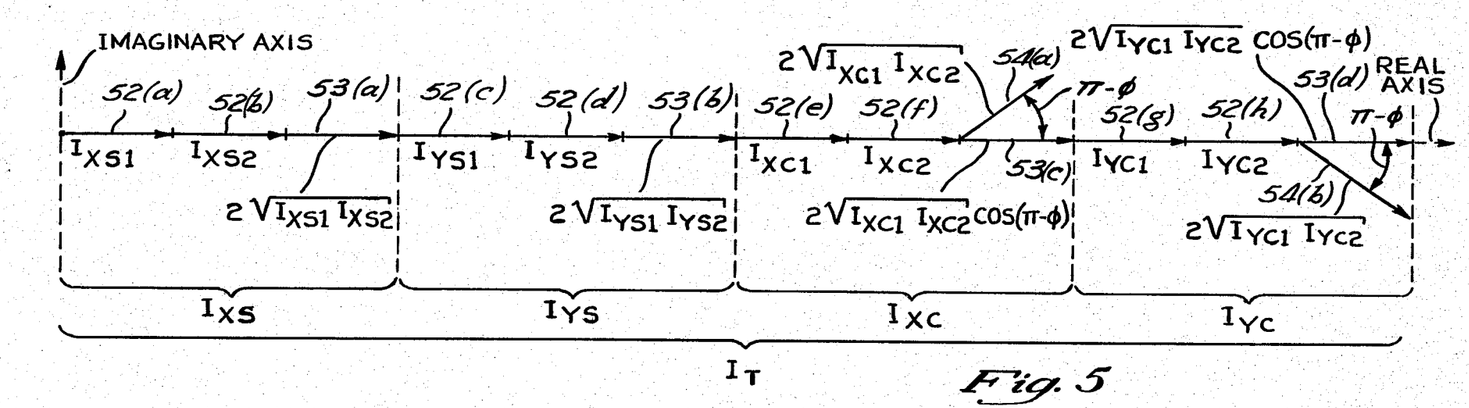
FIG. 5 is a vector diagram showing the intensity components of the combined waves W1, W2 in a complex plane.

Equation (16) is illustrated graphically in the vector diagram of FIG. 5, showing the individual intensity vectors representing the three component terms associated with each of the four intensity components $I_{xs}$, $I_{ys}$, $I_{xc}$, $I_{yc}$, plotted in a complex plane, when the loop 16 is at rest (i.e. $\phi_s = 0$). However, it will be recognized that this diagram is not drawn to scale. It may be seen that the total observable intensity $I_T$ is comprised of the eight vectors representing the sum of the individual intensities of the eight components, $I_{xs1}$, $I_{sx2}$, $I_{ys1}$, $I_{ys2}$, $I_{xc1}$, $I_{xc2}$, $I_{yc1}$, $I_{yc2}$, designated by reference numerals 52(a) through 52(h), respectively, plus four vectors representing the four interference terms associated with the superposition of components $X_{s1}$ with $X_{s2}$, $Y_{s1}$ with $Y_{s2}$, $X_{c1}$ with $Y_{c2}$ and $Y_{c1}$ with $Y_{c2}$, designated by the reference numerals 53(a) through 53(d), respectively.

Figure 6:
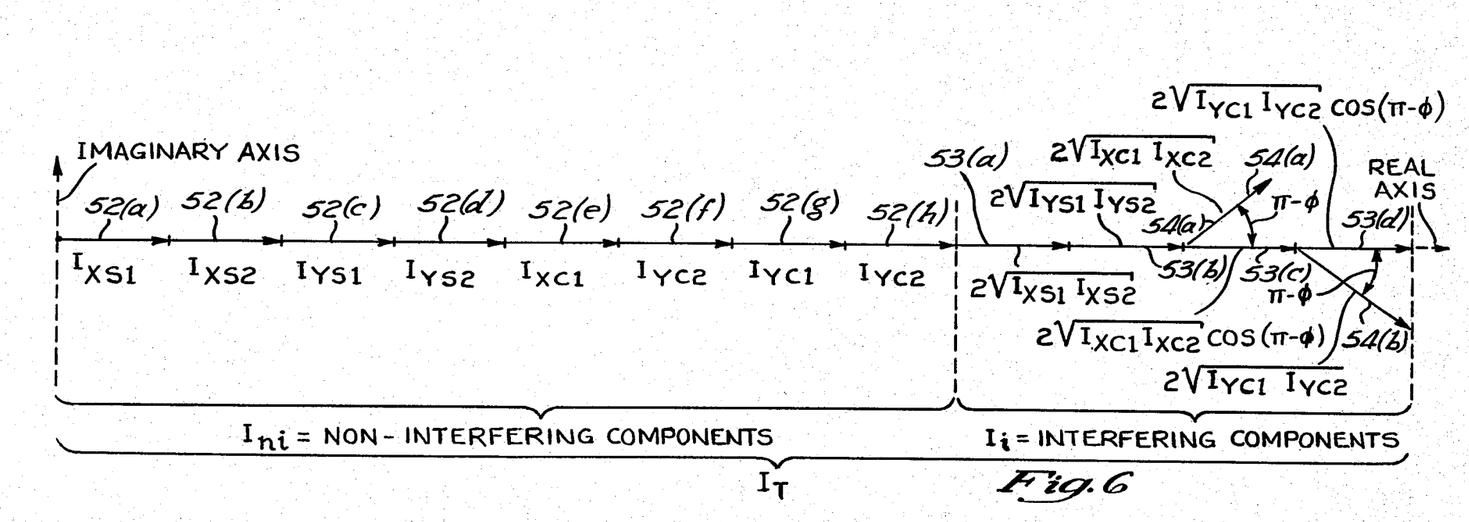
FIG. 6 is a vector diagram, similar to the vector diagram of FIG. 5, with the intensity components rearranged to separate those intensity components representing interference terms from those intensity components representing non-interference terms.

The component vectors of FIG. 5 are rearranged in FIG. 6 so as to separate the vectors representing the interference intensity terms from the vectors representing the non-interference intensity terms. Specifically, the eight vectors 52(a) through (h) represent the non-interference terms while the remaining four vectors 53(a) through (d) represent the interference terms. The resultant of the vectors associated with the interference intensity terms will be referred to as $I_i$ while the resultant of the vectors associated with the non-interference terms will be referred to as $I_{ni}$.

All the vectors 52(a) through (h) and 53(a) through (d) are shown as having the same direction, oriented along the real axis. However, this is merely coincidental, since this occurs only when the loop 16 is at rest ($\phi_s=0$), as presently being assumed. It will be seen subsequently that only the vectors 52(a) through (h), comprising the non-interference terms, have a direction which is constant, along the real axis. The vectors 53(a) through (d), on the other hand, are directed along an axis, referred to herein as the "interference intensity vector axis," which rotates in the manner of a phasor in response to rotation of the loop 16, but which, as previously mentioned, is coincident with the real axis when the loop 16 is at rest, as has been presently assumed.

Figure 7:
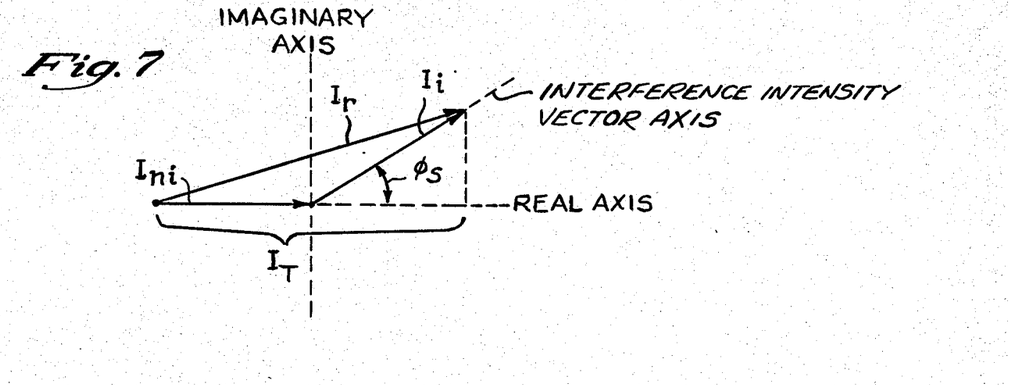
FIG. 7 is a vector diagram showing, in a complex plane, the vector representing the interference intensity components of FIG. 6 rotating, as a phasor, in response to rotation of the loop, and illustrating that the observable intensity of the combined waves W1, W2 at the detector is equal to the projection on the real axis of the resultant of the respective vectors representing the interference and non-interference intensity components.

Accordingly, as shown in the vector diagram of FIG. 7, when the loop 16 is rotated, the Sagnac phase shift $\phi_s$ induced by such rotation will cause the interference intensity axis to rotate, in a complex plane, through the angle $\phi_s$. The vector $I_i$ (representing the interference terms) rotates in coincidence with this axis, through the angle $\phi_s$, while the vector $I_{ni}$ (representing the non-interference terms) remains along the real axis, unaffected by such phase shift $\phi_s$. The resultant of the vectors $I_i$ and $I_{ni}$ will be referred to as $I_r$, the projection of which, on the real axis is equal to $I_T$.

Returning again to the static condition where $\phi_s$ equals zero, as shown in FIG. 6, it will be seen that the vectors 53(c) and 53(d), which correspond to the two intensity interference terms resulting from superposition of the components $X_{c1}$ with $X_{c2}$ and $Y_{c1}$ with $Y_{c2}$, respectively, are actually projections of vectors 54(a) and 54(b) respectively, on the "interference intensity axis" (which, in FIG. 6, is coincident with the real axis). Since the vectors 53(c) and 53(d) are associated with equal and opposite birefringence dependent phase angles, as discussed in reference to equations (14) and (15), the vectors 54(a) and 54(b) will be inclined, in opposite directions from the "interference intensity axis," by the same angle. Thus, the vector addition of these vectors 54(a) and 54(b) along the "interference intensity vector axis," yields a resultant vector which will be directed along this axis and will be equal in magnitude to the sum of their projections 53(c) and 53(d) on this axis. The angular relationship of the vectors 54(a), 54(b) to the "interference intensity vector axis" and the "real axis" will be discussed in more detail below.

It will be recalled from equation (3) that the angle $\phi$ is equal to the sum of the angles $\phi_B$, the birefringence dependent phase shift, and $\phi_s$, the rotationally induced Sagnac phase shift. Examining first the situation where the loop 16 is at rest and $\phi_s$ is zero, as in FIG. 6, it will be understood from the foregoing that when $\phi_s$ equals zero, the above described inclination of the vectors 54(a) and 54(b) from the "interference intensity axis" is due entirely to the birefringence dependent phase shift $\phi_B$, the respective angles of inclination being opposite and equal to $\phi_B$. Consequently, the birefringence dependent phase shifts associated with the two interference term intensity vectors 54(a), 54(b) effectively cancel each other, and the projections 53(c) and 53(d) of these vectors are directed, together with the vectors 53(a) and 53(b) along the real axis. Thus, when the loop 16 is at rest, the resultant of all of the vectors 52(a) through (h), 53(a), 53(b), 54(c), and 54(b) is constant in direction, along the real axis, and thus, the direction of this resultant is independent of birefringence induced phase shifts.

Turning now to the situation where the loop 16 is rotating and $\phi_s$ does not equal zero, the vectors 54(a) and 54(b), in response to such rotation, will be shifted in phase angle by an amount equal to $\phi_s$, with one of the vectors 54 rotating towards the real axis of FIG. 6 while the other vector 54 rotates away from such real axis. Thus, the resultant of the vectors 54(a), 54(b) will rotate by an angle of $\phi_s$ with respect to the real axis. Further, the vectors 53(a) and 53(b), representing the two other intensity interference terms associated with superposition of the components $X_{s1}$ with $X_{s2}$ and $Y_{s1}$ with $Y_{s2}$, respectively, will also rotate with respect to the real axis by an amount $\phi_s$. Thus, all four vectors 53(a), 53(b), 54(a), 54(b) representing interference intensity components, will rotate, in response to rotation of the loop 16, by $\phi_s$. In effect, this rotates the "interference intensity axis" by the angle $\phi_s$ so that the four vectors 53(a), 53(b), 53(c), and 53(d) remain directed along such axis.

From the foregoing it will be recognized that a rotationally induced phase shift ($\phi_s$) causes the vectors 53(a), 53(b), 54(a), 54(b) to rotate in the same direction with respect to the real axis, while a birefringent induced phase shift has no effect on the direction of the vectors 53(a), 53(b), but causes the vectors 54(a), 54(b) to rotate, relative to the interference intensity vector axis, in opposite directions. Thus, any birefringence induced phase shift is effectively cancelled, even when the loop is rotating. Consequently, the behavior of the superposed waves W1, W2, in terms of their combined intensity, as measured at the detector 20, will result in reciprocal operation of the rotation sensor, regardless of whether the loop 16 is static or whether it is rotating.

Rotation Sensing

Referring to FIG. 7, it will be recalled that the resultant of the interference term intensity vectors is $I_i$, the resultant of the non-interference term intensity vectors is $I_{ni}$, and the resultant of the vectors $I_i$, $I_{ni}$ is $I_r$. Further, since the total intensity $I_T$ represents a real or observable, intensity, the value of $I_T$ is equal to the projection of the resultant vector $I_r$ upon the real axis.

Figure 8:
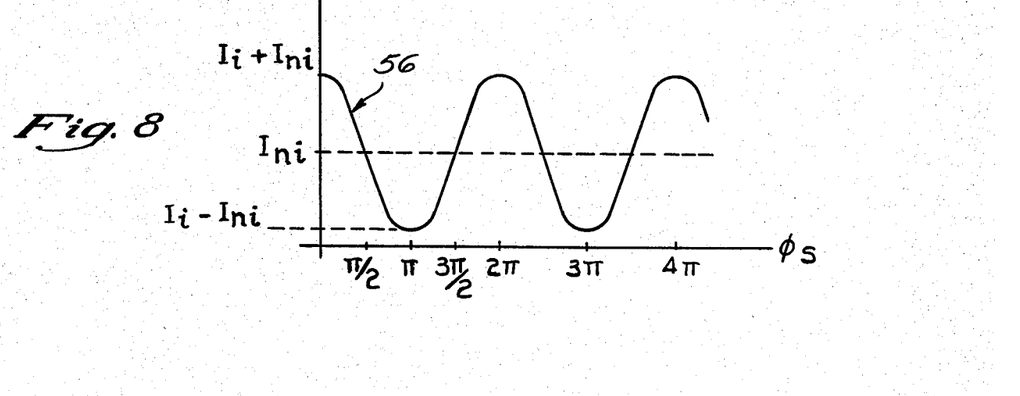
FIG. 8 is a graph of observable intensity at the detector versus rotationally induced phase shift, due to rotation of the loop, the graph of FIG. 8 being developed from the diagram of FIG. 7.

As previously indicated, the distinction between interference terms and non-interference terms is important, since the vectors 53(a) through (d) representing the interference terms are dependent upon rotationally induced phase shifts, while the vectors representing the non-interference terms 52(a) through (h) are independent of rotationally induced phase shifts. Accordingly, as shown in the vector diagram of FIG. 7, when the loop 16 is rotated, the Sagnac phase shift $\phi_s$ induced by such rotation, will cause the vector $I_i$ (representing the interference terms) to rotate, in the manner of a phasor, though the angle $\phi_s$, while the vector $I_{ni}$ (representing the non-interference terms) will be unaffected by such Sagnac phase shift. By plotting, as a function of the angle $\phi_s$, the sum of (a) the magnitude of the projection of the vector $I_i$ on the "real axis", and (b) the magnitude of the vector $I_{ni}$, a graph of the observed intensity $I_T$ of the light impressed upon the detector 20 may be developed. Such a graph of the total observed intensity $I_T$ is shown in FIG. 8 to be a cosine function (designated by the reference numeral 56), having an average intensity equal to the magnitude of the vector $I_{ni}$, a maximum intensity equal to the sum of the magnitudes of the vectors $I_{ni}$ and $I_i$, and a minimum intensity equal to the difference of the magnitudes of the vectors $I_{ni}$ and $I_i$. Thus, it may be seen that the intensity $I_T$ impressed upon the photo detector 20 (FIG. 1) varies as a cosine function 56 in response to a rotationally induced phase shift.

Figure 9:
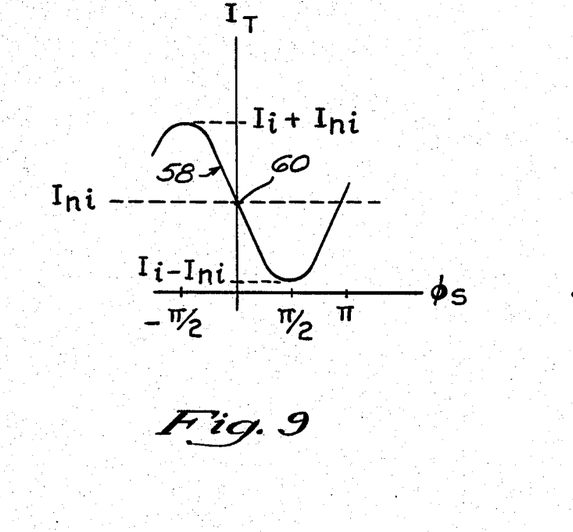
FIG. 9 shows the graph of FIG. 8 after being translated along the horizontal axis by an angle of $\pi/2$ as a result of a non-reciprocal phase shift introduced by the phase shifter of FIG. 1.

However, since the slope of the cosine function 56 shown in FIG. 8 is relatively flat for the small values of $\phi_s$ typically encountered in rotation sensing, the intensity $I_T$ of the combined waves W1, W2 at the detector 20 will be relatively insensitive to rotation of the loop 16. Consequently, it is preferable to bias the cosine function 56 of FIG. 8 by $\pi/2$ (or odd multiples thereof), thereby converting this cosine function 56 to a sine function 58, as shown in FIG. 9. It may be seen that the effect of non-reciprocally biasing the relative phase difference between the counterpropagating waves by $\pi/2$ is to rotate the vector $I_i$ by $\pi/2$ to the position shown in FIG. 10. From FIGS. 9 and 10, it is apparent that, when the phase biased loop 16 is at rest, the operating point of the system will be at the point labeled 60. Since this operating point 60 is on the portion of the intensity curve 58 having maximum slope, as best seen in FIG. 9, such operating point 60 provides maximum sensitivity to rotation.

The above described non-reciprocal biasing of the rotation sensor of the present invention may be accomplished by placing the non-reciprocal phase shifter 17 in the loop 16, as discussed in reference to FIG. 1.

Stability of the Operating Point 60

The effects of changes in birefringence upon the operating point 60, when the loop 16 is at rest, will now be examined.

As is well known, fiber birefringence is affected by environmental factors such as temperature.

Further, changes in birefringence produce corresponding changes in the birefringence dependent phase angle $\phi_B$, as discussed above. However, an additional effect of variations in birefringence relates to a second birefringence dependent term which will be referred to as $\theta$. As used herein, the term $\theta$ is defined as the angle through which the state of polarization is rotated by the fiber 11 of the loop 16. Thus, it is also a measure of the cross coupling between the modes of the single mode fiber 11.

The effect of changes in $\theta$ is to vary the amount of light cross-coupled between the X and Y channels. Thus, the magnitudes of the vectors associated with the "straight through" components will vary inversely with the magnitudes of the vectors associated with the cross-coupled components. As applied to the vectors 52, 53, and 54 of FIG. 6, this will be referred to as the "inverse vector magnitude relationship".

In examining the effects of birefringence upon the operating point 60, shown in FIG. 9, it is important to note that the stability of this operating point 60 is dependent upon the stability of the magnitude and direction of the vector $I_{ni}$ (FIG. 10), which is comprised of the vectors 52(a) through 52(h) (FIG. 6). With respect to birefringence induced changes in the phase angle $\phi_B$, it will be recalled that none of the component vectors 52(a) through (h) are dependent upon this phase angle $\phi_B$, and thus, the direction of the vector $I_{ni}$ will be unaffected by changes in birefringence. However, these vectors 52(a) through (h) will vary in magnitude according to the "inverse vector magnitude relationship" associated with the angle $\theta$, since the individual magnitudes of the vectors 52(a) through (h) are dependent upon the degree of cross-coupling between the X and Y channels. Nevertheless, because of conservation of energy, the sum of these vectors 52(a) through (h) will remain constant, and thus, the magnitude of the vector $I_{ni}$ will remain stable, regardless of changes in birefringence. Therefore, since both the magnitude and direction of the vector $I_{ni}$ remains stable, the operating point 60 will be independent of changes in birefringence and independent of changes in the values of $\theta$ and $\phi_B$.

Stability of the Intensity Curve 58

Although the operating point 60, shown in FIG. 9, remains stable in spite of changes in birefringence, it will be seen that the amplitude of the intensity curve 58 is, in general, dependent upon birefringence.

It will be recalled that the amplitude of the intensity curve 58 is determined by the magnitude of the rotation sensitive vector $I_i$ (FIG. 10), which magnitude is comprised of the individual component vectors 53(a) through (d) (FIG. 6), representing the interference terms. Further, it will be recalled that the vectors 53(c) and 53(d) (representing the cross-coupled interference components) are projections on the interference intensity vector axis of the vectors 54(a) and 54(b) that are dependent in direction on the birefringence dependent phase angle $\phi_B$. Consequently, the magnitudes of the vectors 53(c) and 53(d) are also dependent upon the phase angle $\phi_B$, and thus, vary with birefringence induced changes in such angle. However, since, unlike the vectors 53(c) and 53(d), the vectors 53(a) and 53(b) are not dependent upon the phase angle $\phi_B$, the magnitudes of these vectors will not vary in response to changes in this birefringence dependent phase angle $\phi_B$.

Figure 10:
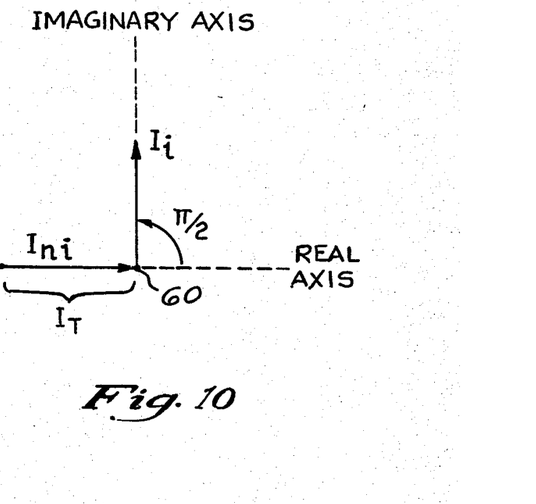
FIG. 10 is a vector diagram, similar to the diagram of FIG. 7, corresponding to the graph of FIG. 9.

Although only the vectors 53 (c) and 53 (d) are dependent in magnitude on the phase angle $\phi_B$, all of the vectors 53 (a) through (d) and 54 (a) and (b), will vary with changes in $\theta$, due to the "inverse vector magnitude relationship", since the magnitudes of these vectors are dependent upon the degree of cross-coupling between the X and Y channels. However, it is important to recognize that this "inverse vector magnitude relationship" applies, in a direct sense, only to the vectors 53 (a), 53 (b), 54 (a) and 54 (b), since the vectors 53 (c) and 53 (d) are only projections on the interference intensity vector axis of the vectors 54 (a) and 54 (b). Thus, the "inverse vector magnitude relationship" applies only indirectly to the vectors 53 (c) and 53 (d), since the magnitudes of these projections vary as a scaled function of the variations in magnitude of the vectors 54 (a) and 54 (b). It will be remembered that the vectors 53 (c) and 53 (d) are of particular interest because these vectors, together with the vectors 53 (a) and 53 (b) comprise the vector $I_i$ (FIG. 10).

Because of conversation of energy, the sum of the individual magnitudes of the vectors 53 (a), 53 (b), 54 (a) and 54 (b) will be constant. However, since the vectors 53 (c) and 53 (d) are scaled functions of the vectors 54 (a) and 54 (b), the magnitude of the vector $I_i$ (FIG. 10), which is comprised of the vectors 53 (a) through (d), will not be constant, and thus, will vary with changes in $\theta$. Therefore, the phasor $I_i$, and thus, the intensity curve 58 (FIG. 9) will vary in amplitude as a function of $\theta$.

Figure 11:
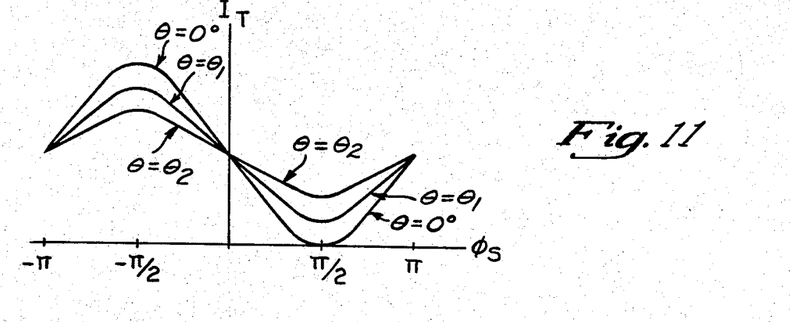
FIG. 11 shows the graph of FIG. 9 and illustrates that environmental changes may affect the amplitude of the observable intensity, but that such amplitude is stable, independent of the environment, when the loop is at rest.

This is illustrated in FIG. 11, which shows the intensity curve 58 of FIG. 9 for various values of θ.

From FIG. 11, it will be seen that when θ is equal to zero, intensity curve 58 FIG. 9 is at maximum amplitude, and thus, for this value of θ, the vector $I_i$ will have the same magnitude as the vector $I_{ni}$. This occurs because, at θ=0°, the vectors 54 (a) and 54 (b), representing the cross-coupled interference terms, have a magnitude of zero (all of the light being in the "straight through" components). This is significant, since the vectors 54 (a) and 54 (b), and their associated projections 53 (c) and 53 (d) are the only vectors dependent in magnitude upon the birefringence dependent phase angle $\theta_B$. Thus, with the elimination of these birefrigence dependent vectors when θ is zero, the operation of the rotation sensor of the present invention will be independent of changes in birefrigence.

The general relationship among the normalized intensity $I_T$, the environmental factor θ, the birefringence-dependent phase shift $\phi_B$, and the rotationally-induced Sagnac phase shift $\phi_s$, may be expressed as follows. The term "π/2" will be recognized as the non-reciprocal phase bias introduced by the phase shifter 17 (FIG. 1).

$$I_T = \tfrac{1}{2} + \tfrac{1}{2}(\cos^2 \theta - \sin^2 \theta \cos \phi_B) \cos (\phi_s - \pi/2) \qquad (17)$$

When θ is equal to zero, equation 17 may be rewritten as follows:

$$I_T = \tfrac{1}{2} + \tfrac{1}{2} \cos (\phi_s - \pi/2) \qquad (18)$$

Thus, as pointed out above, if the state of polarization is controlled so that θ equals zero, the intensity $I_T$ measured at the dectector 20 (FIG. 1) is a function of the Sagnac phase shift $\phi_s$, and is independent of the variables θ and $\phi_B$.

Such control of the state of polarization may be accomplished in a well known manner by utilizing the polarization controller 18, discussed in reference to FIG. 1. In practice, however, it is difficult to control the state of polarization precisely, and thus, use of such controller 18 will generally result in only a reduction in the dependency of $I_T$ on the variables θ and $\phi_B$. In any case, it will be recognized that, by providing a stable operating point 60 when the loop 16 is at rest, the rotation sensor of the present invention can produce greater rotation sensing accuracy than polarized light rotation sensors, which do not have a stable operating point (other than zero).

An alternative method of reducing dependency upon the variables θ and $\phi_B$, and thus, improve the rotation sensing accuracy of the present invention, is to non-reciprocally variably bias the relative phase shift between the counterpropagating waves so that the system is continually biased to operate at the stable environmentally independent, operating point 60. Since the amount of such non-reciprocal biasing required is equal to the rotationally induced phase shift $\phi_s$, the detector output signal may be utilized as a feed back signal to variably control the amount of such phase shift. This may be understood more fully by referring to FIG. 12 which illustrates the detector output signal (representing the intensity $I_T$ measured by the detector 20) being fed from the detector 20 to a controller 70 over a line 72. The controller 70 compares the signal on the line 72 with a reference intensity signal, representing the average value of the curve 58 (FIG. 9), sent to the controller 70 over a line 76 from a reference intensity signal generator 78. The difference between the detector intensity signal and the reference intensity signal is sent as a signal, over a line 80 to a phase shifter 82, which introduces a non-reciprocal phase shift into the loop 16 that is proportional to the signal on the line 80. This non-reciprocal phase shift offsets the rotationally induced Sagnac phase shift, and thus, returns the system to the stable operating point 60 (FIG. 9). As is common, the phase shifter 82, may, for example, involve application of a magnetic field to a portion of the loop 16. The current to, or voltage across, the phase shifter 82 may be utilized as a measure of the phase shift introduced thereby. Accordingly, a sensor 84 is provided to measure the current associated with the signal on the line 80. This sensor 84 outputs a signal proportional to the current on the line 80, and sends such signal to the controller 70 over the line 86. The controller 70, in response to the signal from the phase shift sensor 84, computes the rotation associated therewith and displays the value on a display panel 88.

Figure 12:
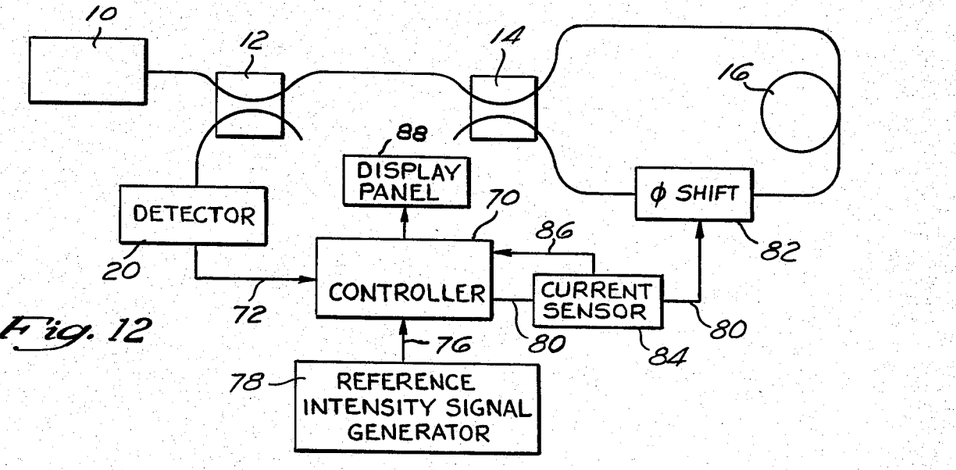
FIG. 12 is a schematic diagram of the rotation sensor of the present invention, showing a controller connected to a phase shifter for a phase biasing the intensity curve of FIG. 9, in response to the observed intensity at the detector, by an amount equivalent to the rotationally induced phase shift, to cause the rotation sensor to operate at a stable, environmentally independent, operating point.

Thus, utilizing the circuit shown in FIG. 12, the rotation sensor of the present invention may be biased to operate at the stable, environmentally independent, operating point 60, thereby substantially improved rotation sensing accuracy.

It will be recognized that, even without the polarization controller 18 (FIG. 1), or the phase shifter 82 (FIG. 12), discussed above, the rotation sensor of the present invention is more stable, and thus, less sensitive to long term gradual environmentally induced changes in birefringence than are rotation sensors utilizing polarized light. This has been shown experimentally by examining the standard deviation of the average value of the intensity $I_T$ measured at the detector 20. It has been found that such standard deviation is smaller for the unpolarized light rotation sensor of the present invention, than for polarized light rotation sensors with output polarizers. This reduction in the standard deviation is believed to be due to an offsetting effect between the birefringence induced changes in the rotation of the state of polarization θ and the birefringence induced changes in the phase shift $\phi_B$. The present invention, therefore, provides an advantage in stability of the rotation signal, which may reduce the levels of filtering and feedback required to achieve a given stability.

Additional characteristics of the Couplers

As is well known, couplers, such as the coupler 14 of FIG. 1, can introduce additional birefringence into the rotation sensor. Further, this birefringence varies with changes in environmental factors, and thus, if its effect is non-reciprocal, as between the counterpropagating waves W1, W2, the coupler may introduce an additional birefringence dependent phasse shift.

Figure 13:
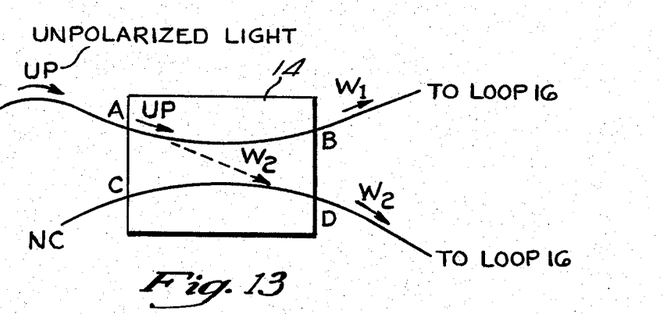
FIG. 13 is a schematic diagram of the coupler of FIG. 1 that is adjacent to the loop, showing the unpolarized light being split into two counterpropagating waves W1, W2 and illustrating, in combination with FIG. 14, the reciprocal operation of this coupler.

To prevent coupler-induced birefringence from affecting the reciprocal operation of the rotation sensor, the present invention utilizes two couplers 12, 14 (FIG. 1). The coupler 14 is shown enlarged, and schematically, in FIGS. 13 and 14. Referring initially to FIG. 13, the unpolarized light, indicated by the arrow labeled "UP", from the light source 10 (FIG. 1), travels through the coupler 12 (FIG. 1) to the coupler 14, where it is split into two counter-propagating waves W1, W2. However, only one of these waves, W2, is cross-coupled from port A to port D of the coupler 14, while the other wave, W1, travels straight through from port A to port B of the coupler 14. Such cross-coupling introduces a coupler-induced phase shift between the waves W1, W2, since the wave W2, due to the cross-coupling, travels a slightly different path. However, after the waves W1, W2 have traversed the loop 16, the wave W1 is cross-coupled from port D to port A, while the wave W2 travels straight through, from port D to port A. Thus, when the waves W1, W2 are recombined at the port A. each of the waves W1, W2 will have been cross-coupled once, thereby making their paths equal. Therefore, the coupler-induced phase shift associated with the wave W2 when the beams are split, is cancelled by the coupler-induced phase shift associated with the wave W1 when the waves W1, W2 are recombined. Consequently, the birefringence-induced phase shift associated with the coupler 14 is reciprocal as to the waves W1, W2, and therefore, operation of the rotation sensor of the present invention is reciprocal. It will be understood that the purpose of the coupler 12 (FIG. 1) is merely to transfer the recombined waves W1, W2 from the fiber 11 to the fiber 19 (FIG. 1) for transmission to the detector 20 (FIG. 1).

Figure 14:
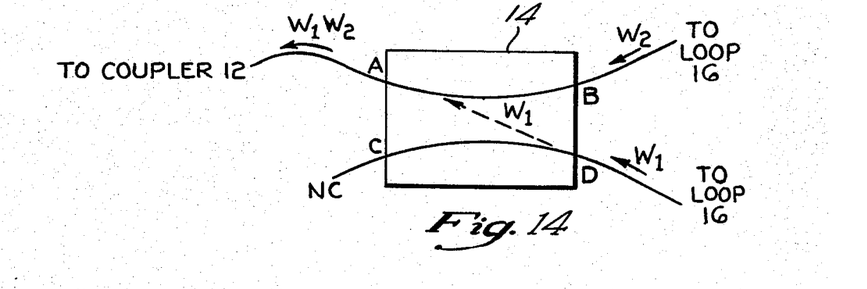
FIG. 14 is a schematic diagram of the coupler of FIG. 13 showing the two counterpropagating waves W1, W2 being recombined for transmission to the detector, and illustrating, in combination with FIG. 14, the reciprocal operation of this coupler.

Preferably, the coupling coefficient of the coupler 14 is 0.5. As used herein, the term coupling coefficient (c) is the ratio of the power or intensity of that portion of the light beam that is coupled, to the total power or intensity of such light beam. Thus, at full coupling C=1, while at no coupling C=0.

A coupling coefficient of 0.5 is advantageous because such coefficient provides maximum intensity of the waves W1, W2 after they have been recombined by the coupler 14. This may be understood more fully by first analyzing the intensity of the unpolarized light after it is split into the waves W1, W2 by the coupler 14 and then analyzing the waves W1, W2 after they have traversed the loop 16 and have been recombined by the coupler 14. Accordingly, when the unpolarized light entering the coupler 14 is split onto the waves W1, W2, the coupled portion of the unpolarized light (UP) representing the wave W2, will have an intensity equal to the product of $C_{14}$ and $I_{UP}$, where $I_{UP}$ is the intensity of such unpolarized light and $C_{14}$ is the coupling coefficient of the coupler 14. The uncoupled portion of the unpolarized light, representing the wave W1, will therefore, have an intensity equal to the product of $(1-C_{14})$ and $I_{UP}$. After the waves W1, W2 have traversed the loop 16, they are each split by the coupler 14. Accordingly, the power and corresponding intensity of the wave W1, which will be referred to as $I_{W1}$, is split, in accordance with the coupling coefficient $C_{14}$, so that a portion thereof, $C_{14}I_{W1}$ is coupled from port D to port A, with the uncoupled portion $(1-C_{14})I_{W1}$ passing directly from port D to port C. Similarly, the power and corresponding intensity of the wave W2, which will be referred to as $I_{W2}$, is split, so that a portion $C_{14}I_{W2}$ is coupled from port B to port C, with the remaining uncoupled portion $(1-C_{14})I_{W2}$ passing directly from port B to port A. As indicated above, only the light at the port A is of interest, since this light is independent of coupler-induced birefringence. Thus, the effect of the coupling coefficient upon the intensity $I_{W1,W2}$ of the combined waves W1, W2 at port A will be examined. Since each wave W1, W2 passed through the coupler 14 twice, but was coupled only once, the intensity $I_{W1,W2}$ of the recombined waves W2, W2 at port A is defined by:

$$I_{w1w2} = [C_{14}(1-C_{14})(I_{w1})] + [C_{14}(1-C_{14})(I_{w2})] + [2C_{14}(1-C_{14})]\sqrt{I_{w1}I_{w2}}\cos\phi_s \quad (19)$$

Since the terms $C_{14}(1-C_{14})$ of equation (19) are at a maximum when $C_{14}=0.5$, it will be recognized that the intensity $I_{W1,W2}$ is at a maximum when the coupling coefficient of the coupler 14 is 0.5.

This same reasoning applies to the coupler 12 of FIG. 1. For example, if the intensity of the unpolarized light from the source 10 at port A of coupler 12 is referred to as $I_s$, the intensity of $I_s$ at port B of coupler 12 will be $(1-C_{12})I_s$, where $C_{12}$ is the coupling coefficient of the coupler 12. Further, after this light from port B of the coupler 12 has traversed the loop 16 and returns thereto in the form of the combined waves W1, W2, the intensity $I_{W1,W2}$ of these combined waves may be expressed as:

$$I_{w1w2} = f(\phi_s, C_{14})(1-C_{12})I_s \quad (20)$$

where $f(\phi_s, C_{14})$ is a function of the Sagnac phase shift and the coupling coefficient of the coupler 14. When $I_{W1,W2}$ is split at the coupler 12 (FIG. 1) for transmission through the fiber 19 (FIG. 1) to the detector 20 (FIG. 1), the intensity $I_T$ at the detector 20, in terms of the coupling coefficient will be:

$$I_T = C_{12}(I_{w1w2}) \quad (21)$$

or, substituting equation (20) in equation (21):

$$I_T = f(\phi_s, C_{14})[(C_{12})(1-C_{12})]I_s \quad (22)$$

Thus, for a given value of $f(\phi_s, C_{14})$, the intensity $I_T$ will be at a maximum when the coupling coefficient for the coupling 12 is 0.5. It is preferable, therefore, that both of the couplers 12,14 have a coupling coefficient of 0.5.

Moreover, similar reasoning is applicable to the coupler 34 of FIG. 1. It will be recalled that the light output from the source 10, through the fiber 11, is of substantially equal intensity for both of the orthogonal polarization modes, since this produces substantially unpolarized light, thus, assuming that the sources 26, 27 are of equal intensity, the coupler 34 should have a coupling coefficient of 0.5 in order to produce unpolarized light. It will be recognized that if the coupling coefficient is something other than 0.5, the respective intensities of the light sources should be adjusted accordingly for the output to be unpolarized. Thus, for example, if the coupling coefficient is 0.6, the source 26 should provide 60% of the combined intensity of the sources 26, 27, and the source 27 should provide 40% of such intensity. In general, the source 26, (which provides power directly into the fiber 11, and thus directly to port B) should provide a fraction of the intensity that is equal to the coupling coefficient while the source 27 (which provides power into the fiber 32, for coupling to port B) should provide a fraction of the intensity that is equal to one minus the coupling coefficient.

In summary, the present invention, by utilizing substantially unpolarized light, achieves reciprocity without the use of polarizers or other special equipment. Further, when non-reciprocally biased to an odd multiple of $\pi/2$, the system has a stable operating point at rest, which is insensitive to changes in the rotation of the stage of polarization $\theta$ or the birefringence dependent phase shift $\phi_B$.

What is claimed:

1. An improved fiber optic rotation sensor employing detection of the rotationally induced "Sagnac" phase shift between counterpropagating waves in a fiber loop, said sensor being substantially insensitive to non-rotationally induced phase shifts caused by changes in those environmental factors, such as temperature, which produce corresponding changes in the birefringence of said fiber, said sensor comprising:

a single mode optical fiber forming a loop;

a light source for producing substantially unpolarized light to launch the polarization modes of said optical fiber with light of equalized intensity;

means optically coupled to said loop for (i) splitting said unpolarized light in said fiber into two waves, each of said waves propagating in opposite directions through said loop, the phase difference between said counterpropagating waves responsive to rotation of said loop, and for (ii) combining said counterpropagating waves to provide a wave defining an optical output signal, said optical output signal comprised light from all of the polarization modes of said fiber and varying in intensity in response to the phase shift between said counterpropagating waves, said substantially unpolarized light causing phase shifts induced by fiber birefringence to substantially cancel so that said phase shift between said counterpropagating waves is substantially independent of fiber birefringence, and substantially equal to said Sagnac phase shift;

means optically coupled to said fiber for sensing the entire said optical output signal to indicate velocity of rotation of said loop, said unpolarized light causing the average intensity of said optical output signal to be substantially constant and independent of fiber birefringence, the intensity of said output signal approximatley equal to said average intensity when said Sagnac phase shift is at odd multiples of $\pi/2$; and means optically coupled to said loop for biasing said phase shift between said counterpropagating waves so that the intensity of said output signal is approximately equal to said average intensity and substantially independent of changes in fiber birefringence, when said loop is at rest and said Sagnac shift is zero.

2. An improved fiber optic rotation sensor employing detection of the "Sagnac phase shift", said rotation sensor being substantially insensitive to changes in those environmental factors, such as temperature, which produce birefringence in the optical fiber, said sensor comprising:

a loop of single mode optical fiber having two polarization modes, said fiber being subject to changes in birefringence caused by changes in environmental factors;

means for coupling counterpropagating light waves to orthogonal polarization modes of said loop such that the intensity of the light in each of said modes is equalized, the components of said light waves which travel in the same direction in said mutually orthogonal modes having a phase difference there between varying substantially randomly with time; and means, coupled to said loop for sensing light from all of the polarization modes of said fiber for both of said waves to detect the relative phase shift between said counterpropagating light waves, said phase shift being substantially independent of birefringence induced cross-coupling between the two polarization modes of said single mode optical fiber.

3. An improved fiber optic rotation sensor employing detection of the "Sagnac phase shift", said rotation sensor being substantially insensitive to changes in those environmental factors, such as temperature, which produce changes in birefringence in the optical fiber, said sensor comprising:

a source of substantially unpolarized light;

a loop of single mode optical fiber having two polarization modes subject to cross-coupling such as caused by birefringence;

means for coupling said source of substantially unpolarized light to said loop of fiber for producing counterpropagating substantially unpolarized light waves in said loop, said unpolarized light waves providing light of substantially equal intensity in said modes; and means, optically coupled to said loop for sensing light from all of the polarization modes of said fiber for both of said waves to detect the relative phase shift between said counterpropagating light waves, said phase shift being substantially independent of cross-coupling between said two polarization modes of said loop.

4. A fiber optic rotation sensor, utilizing unpolarized light, comprising:

a loop of single mode optical fiber having two polarization modes;

a light source for producing substantially unpolarized light, said source coupled to said fiber to launch the two polarization modes of said fiber with light of equalized intensity;

means optically coupled to said loop, for splitting said unpolarized light in said fiber into two waves, each of said waves propagating in opposite directions through said loop, the phase difference between said counterpropagating waves responsive to rotation of said loop, and for combining said two counterpropagating waves to provide a wave defining an optical output signal, said optical output signal comprised of light from all of the polarization modes of said fiber and varying in optical intensity in response to rotation of said loop; and means, optically coupled to said fiber for sensing the entire said output signal to indicate velocity of said rotation of said loop, the accuracy of said rotation sensor dependent upon the degree to which said substantially unpolarized light is unpolarized.

5. A fiber optic rotation sensor, as defined by claim 4, wherein said substantially unpolarized light substantially eliminates phase shifts induced by birefringence of said fiber, the degree to which said birefringence dependent phase shifts are eliminated dependent on the degree to which said substantially unpolarized light is unpolarized.

6. A fiber optical rotation sensor, as defined by claim 4, additionally comprising means for non-reciprocally biasing said counterpropagating waves by $\pi/2$ so that said output signal wave has an intensity which is substantially independent of environmental factors, when said loop is at rest, the degree to which said intensity is independent of environmental factors dependent on the degree to which said light is unpolarized.

7. A fiber optic rotation sensor, as defined by claim 6, additionally comprising:

means for non-reciprocally biasing said counterpropagating waves to provide a non-reciprocal phase shift approximately equal to said rotation-responsive phase shift between said waves, said non-reciprocal phase shift causing said rotation sensor to operate at a point which is substantially stable and independent of environmental factors, the degree of stability and independence from environmental factors dependent on the degree to which said light is unpolarized.

8. A fiber optic rotation sensor, as defined by claim 7, wherein said biasing means comprises:
a phase shifter; and
means responsive to said output signal wave for driving said phase shifter.

9. A fiber optic rotation sensor, as defined by claim 4, wherein said sensing means comprises a photodetector which produces an electrical output signal proportional to the optical intensity of said optical output signal.

10. A fiber optic rotation sensor, as defined by claim 4, wherein said splitting and combining means comprises a coupler having a coupling coefficient which (i) splits said unpolarized light so that said counterpropagating waves have substantially equal intensities, and (ii) combines said counterpropagating waves forming said optical output signal, said counterpropagating waves traveling equivalent paths through said coupler.

11. A fiber optic rotation sensor, utilizing unpolarized light, comprising:
a single mode optical fiber forming a loop, said fiber having two orthogonal polarization modes;
a light source for producing substantially unpolarized light, comprising:
a pair of laser sources providing light having mutually orthogonal polarizations, the light from one of said pair of laser sources substantially incoherent with respect to the light from the other of said pair of laser sources, and the intensity of said light in one of said orthogonal polarizations substantially equal to the intensity of said light in the other of said orthogonal polarizations;
means for optically coupling said light source to said optical fiber to introduce said unpolarized light into said optical fiber;
means optically coupled to said loop, for splitting said unpolarized light in said fiber into two waves, each of said waves propagating in opposite directions through said loop, the phase difference between said counterpropagating waves responsive to rotation of said loop, and for combining said two counterpropagating waves to provide a wave defining an optical output signal, said optical output signal wave varying in optical intensity in response to rotation of said loop; and
means optically coupled to said fiber for sensing said output signal to indicate velocity of said rotation of said loop, the accuracy of said rotation sensor dependent upon the degree to which said substantially unpolarized light is unpolarized.

12. A fiber optic rotation sensor, utilizing unpolarized light, comprising:
a single mode optical fiber forming a loop, said fiber having two orthogonal polarization modes;
a light source for producing substantially unpolarized light, comprising:
a first laser source, optically coupled to said fiber;
a second laser source, optically coupled to a second fiber; and
a coupler for optically coupling said fiber with said second fiber, said coupler having a predetermined coefficient of coupling, said first laser source providing a fraction of the total combined power of said laser source equal to said coupling coefficient, said second laser source providing a fraction of said total power equal to one minus said coupling coefficient;
means optically coupled to said loop, for splitting said unpolarized light in said fiber into two waves, each of said waves propagating in opposite directions through said loop, the phase difference between said counterpropagating waves responsive to rotation of said loop, and for combining said two counterpropagating waves to provide a wave defining an optical output signal, said optical output signal comprised of light from all of said polarization modes and varying in optical intensity in response to rotation of said loop; and
means optically coupled to said fiber for sensing the entire said output signal to indicate velocity of said rotation of said loop, the accuracy of said rotation sensor dependent upon the degree to which said substantially unpolarized light is unpolarized.

13. A fiber optic rotation sensor, comprising:
a single mode optical fiber, forming a loop having first and second ends, said fiber having first and second orthogonal polarization modes;
means for propagating a first beam of light through said loop in a first direction, from said first end to said second end, a first fraction X1 of said first beam propagating in said first polarization mode and a second fraction Y1 of said first beam propagating in said second polarization mode, said fractions X1, Y1 substantially equal in intensity, the birefringence of said fiber causing (i) a cross-coupled fraction XC1 of said first fraction X1 to be in said second mode, with the remaining fraction XS1 in said first mode, when said first beam reaches said second end, and (ii) a cross-coupled fraction of said second fraction YC1 to be in said first mode, with the remaining fraction YS1 in said second mode, when said first beam reaches said second end;
means for propagating a second beam of light through said loop in a second direction, opposite from said first direction, from said second end to said first end, a first fraction X2 of said second beam propagating in said first polarization mode and a second fraction Y2 of said second beam propagating in said second polarization mode, said fractions X2, Y2 substantially equal in intensity, the birefringence of said fiber causing (i) a cross-coupled fraction XC2 to be in said second mode, with the remaining fraction XS2 in said first mode, when said second beam reaches said first end, and (ii) a cross-coupled fraction YC2 of said second fraction Y2 to be in said first mode, with the remaining fraction YS2 in said second mode, when said second beam reaches said first end;
means for combining said fractions of said first and second beams at said second and first ends, respectively, said fractions superposing at said combining means such that (i) the phase difference, as between said fractions XS1 and YC1, XS2 and YC2, YS1 and XC1, and YS2 and XC2 are each substantially random and uniformly distributed over time, (ii) the polarization of the fractions in said first polarization mode is orthogonal with respect to the polarization of the fractions in said second polarization mode, (iii) said cross-coupled fractions XC1 and XC2 are substantially coherent with a substantially constant first birefringence-dependent phase difference therebetween, and said cross-coupled fractions YC1 and YC2 are substantially coherent with a substantially constant second birefringence dependent phase difference therebetween, said first and second birefringence dependent phase differences substantially equal and opposite with respect to each other, and (iv) said remaining fractions XS1, XS2, YS1, and YS2 have substantially no birefringence dependent phase difference therebetween;

means for sensing all of said superposed fractions of said combined light beams to indicate the velocity of rotation of said loop.

14. A fiber optic rotation sensor, as defined by claim 13, wherein said sensing means detects the intensity of said superposed light beam fractions, said sensing means averaging said random phase shift to zero over time, said cross-coupled fractions XC1 and XC2 interfering and said cross-coupled fractions YC1 and YC2 interfering to produce respective intensities having substantially equal magnitude so that, when said cross-coupled fractions XC1, XC2, YC1 and YC2 are superposed, said first and second equal and opposite birefringence dependent phase differences cancel to cause the phase angle of said superposed cross-coupled fractions to be substantially independent of birefringence.

15. A fiber optic rotation sensor comprising:
a single mode optical fiber forming a loop, said fiber having plural orthogonal polarization modes each of which propagates light at a different velocity;
means optically coupled to said loop, for (i) introducing light into all of said plural orthogonal polarization modes of said fiber at both ends of said loop to produce counterpropagating lightwaves in said loop, the optical intensity of said light substantially evenly divided among said plural orthogonal polarization modes, (ii) combining said counterpropagating lightwaves to produce an optical output signal comprised of light from all of said plural orthogonal polarization modes, said optical output signal varying sinusoidally in response to the phase difference induced by rotation of said loop, the average intensity of said sinusoidal optical output signal substantially independent of changes in birefringence; and
means for sensing the intensity of the entire said optical output signal.

16. A fiber optic rotation sensor, as defined by claim 15, additionally comprising compensating means, optically coupled to said loop, for controlling the polarization of said lightwaves to compensate for reductions in optical output signal intensity caused by fiber birefringence.

17. A fiber optic rotation sensor, as defined by claim 16, wherein said compensating means comprises a polarization controller.

18. A fiber optic rotation sensor, as defined by claim 15, additionally comprising means, optically coupled to said loop, for biasing said phase difference between said counterpropagating waves, so that when said loop is at rest, said sensed intensity is substantially equal to said average intensity, and thus, independent of changes in said fiber birefringence.

19. A fiber optic rotation sensor, as defined by claim 18, wherein said biasing means is a phase shifter.

20. A fiber optic rotation sensor, as defined by claim 18, wherein said sensing means is connected to drive said biasing means, said sensing means providing an electrical signal which varies in proportion to the sensed intensity of said optical output signal, said electrical signal utilized as a feedback signal for said biasing means to bias said phase difference between said counterpropagating waves by an amount which substantially cancels any phase difference induced by rotation of said loop so that said sensed intensity is substantially independent of birefringence when said loop is rotating.

21. A fiber optic rotation sensor, as defined by claim 20, additionally comprising means for sensing the magnitude of said feedback signal to indicate the velocity of rotation of said loop.

22. The method of operating a Sagnac sensor comprised of a loop of single mode optical fiber so as to cancel phase changes between coherent components of light which are caused by the residual birefringence of said single mode optical fiber, said method comprising the step of:
energizing orthogonal polarization modes of said optical fiber, at one end of said loop, with light waves having a phase difference which is random with time, each of said light waves producing intensities which are substantially equal for each of said orthogonal polarization modes, said waves propagating in a first direction around said loop; and
simultaneously performing said energizing step for the other end of said loop to provide waves propagating in a second direction around said loop;
combining said lightwaves after propagation through said loop to form an optical signal comprised of light from all of the polarization modes of said fiber; and
detecting the entire said optical signal.

23. The method of claim 22, additionally comprising the step of:
controllably producing interference between said lightwaves propagating in said first direction and said lightwaves propagating in said second direction to vary said detected intensity.

24. The method of claim 23, wherein said step of controllably producing interference between said lightwaves comprises the step of rotating said loop.

25. The method of operating a Sagnac sensor comprised of a single mode fiber loop so as to cancel phase differences between coherent components of light waves propagating therethrough which are caused by the residual birefringence of said optical fiber, said method comprising the steps of:
energizing both ends of said single mode optical fiber loop with light to provide said counterpropagating waves;
equalizing the intensity of said light among the orthogonal polarization modes of said fiber to cause said phase differences to cancel; and
sensing light from all of said polarization modes for both of said waves.

26. A fiber optic rotation sensor, having a detector for sensing rotation, comprising:
a single mode optical fiber forming a loop;
means for optically coupling a substantially unpolarized light beam to said optical fiber such that the light in the orthogonal polarization modes of said fiber is equalized as to intensity;
means optically coupled to said loop, for (i) splitting said light beam into a first light wave and second light wave, said light waves propagating through said loop in opposite directions, said first wave traveling a different path through said splitting means than said second wave, and for (ii) combining said light waves after they have counterpropagated said loop, said second wave traveling a path through said combining means equivalent to the path said first wave travelled through said splitting means, and said first wave traveling a path through said combining means equivalent to the path said second wave travelled through said splitting means so that the respective overall paths of said first and second waves are substantially equal;

means, optically coupled to said fiber, for coupling at least a fraction of said light waves, after they are combined by said combining means, from said fiber to said detector, said fraction comprised of light from all of the polarization modes of said fiber.

27. A fiber optic rotation sensor, as defined by claim 26, wherein said means for splitting and combining comprises a directional coupler having a coupling coefficient of approximately 0.5.

28. A fiber optic rotation sensor, as defined by claim 27, wherein said means for coupling comprises a directional coupler having a coupling coefficient of approximately 0.5.

29. A fiber optic rotation sensor having a detector for sensing rotation, comprising:
a single mode optical fiber forming a loop;
a light source for coupling a beam of substantially unpolarized light to said fiber to launch the orthogonal polarization modes of said fiber with light of equalized intensity;
a first coupler, optically coupled to said loop, for (i) splitting said beam of substantially unpolarized light into two waves propagating through said loop in opposite directions, and for (ii) combining said counterpropagating waves after they have propagated through said loop;
a second coupler, optically coupled to said fiber, between said light source and said first coupler, for coupling at least a fraction of said lightwaves, after they are combined by said first coupler, to said detector, said fraction comprised of light from all of the polarization modes of said fiber; and
said first and second couplers each having coupling coefficients of approximately 0.5 to provide maximum power of said lightwaves coupled to said detector.

30. A fiber optic rotation sensor, having a detector for sensing rotation, said sensor comprising:
a single mode optical fiber forming a loop, said fiber having two orthogonal polarization modes;
a light source for producing substantially unpolarized light, said light source optically coupled to said fiber, for propagating a beam of substantially unpolarized light through said fiber, said light source comprising:
a first laser source, optically coupled to said fiber;
a second laser source, optically coupled to a second fiber; and
a coupler for optically coupling said fiber with said second fiber, said coupling having a predetermined coefficient of coupling, said first laser source providing a fraction of the total combined power of said laser sources equal to said coupling coefficient, said second laser source providing a fraction of said total power equal to one minus said coupling coefficient;
a first coupler, optically coupled to said loop, for (i) splitting said beam of substantially unpolarized light into two waves propagating through said loop in opposite directions, and for (ii) combining said counterpropagating waves after they have propagated through said loop;
a second coupler, optically coupled to said fiber, between said light source and said first coupler, for coupling at least a fraction of said lightwaves, after they are combined by said first coupler, to said detector, said fraction comprised of light from all of the polarization modes of said fiber; and
said first and second couplers each having coupling coefficients of approximately 0.5 to provide maximum power of said lightwaves coupled to said detector.

31. A fiber optic rotation sensor, comprising:
a loop of single mode optical fiber having two orthogonal polarization modes;
means selected to reduce birefringence-induced phase errors in said rotation sensor, for launching light into said fiber such that the intensity of said light is equalized among the orthogonal polarization modes of said fiber, and the phase difference between light in said modes of said fiber varies randomly with time, to provide a pair of substantially unpolarized lightwaves in said loop for propagation thereabout in opposite directions;
means for combining said lightwaves to provide an optical output signal; and
means for detecting the entire said optical output signal to sense the velocity of rotation of said loop.

32. In a fiber optic sensor utilizing a Sagnac interferometer comprised of a loop of single mode optical fiber having two orthogonal polarization modes, a method of reducing errors in said sensor, comprising:
introducing light into said two orthogonal polarization modes of said loop of optical fiber to provide a pair of counterpropagating waves in said loop;
equalizing the light intensity for said two orthogonal polarization modes of said fiber for each of said counterpropagating waves to reduce non-rotationally induced phase errors between said counterpropagating waves; and
detecting light from all of the polarization modes of said fiber.

33. A fiber optic sensor, comprising:
a single mode optical fiber, forming a loop, said fiber having two orthogonal polarization modes, each of which has a different propagation velocity;
means for introducing light into said two polarization modes to provide lightwaves in said optical fiber at both ends of said loop for propagation in opposite directions about said loop, the intensity of each of said lightwaves substantially evenly distributed over said two orthogonal polarization modes of said fiber to cause cancellation of birefringence induced phase errors;
means for combining said lightwaves after propagation about said loop to form an optical output signal comprised of light from all of the orthogonal polarization modes of said fiber; and
a detector for detecting said optical output signal, the detected signal comprised of light from all of the orthogonal polarization modes of said fiber.

34. A fiber optic rotation sensor, comprising:
a loop of optical fiber, having plural orthogonal polarization modes, each of said modes propagating light at a different velocity;
a light source for introducing light into said plural orthogonal polarization modes to provide counterpropagating lightwaves in said loop, each of said lightwaves having an intensity which is distributed among said plural orthogonal polarization modes so as to equalize the light intensity for said plural orthogonal polarization modes; and a detector positioned to receive light from all of said plural orthogonal polarization modes for both of said lightwaves to sense rotation.

35. A fiber optic rotation sensor, as defined in claim 34, wherein the light launched in each of said plural orthogonal polarization modes is random in phase over time with respect to other of said plural orthogonal polarization modes.

36. A fiber optic rotation sensor, as defined by claim 35, wherein said plural orthogonal polarization modes comprise the two orthogonal polarization modes of a single mode fiber.

* * * * *